US008275731B2

(12) United States Patent
Meijer et al.

(10) Patent No.: US 8,275,731 B2
(45) Date of Patent: Sep. 25, 2012

(54) ANONYMOUS TYPES FOR STATICALLY TYPED QUERIES

(75) Inventors: Henricus Johannes Maria Meijer, Mercer Island, WA (US); Anders Hejlsberg, Seattle, WA (US); Matthew J. Warren, Redmond, WA (US); Luca Bolognese, Redmond, WA (US); Peter A. Hallam, Seattle, WA (US); Gary S. Katzenberger, Woodinville, WA (US); Dinesh C. Kulkami, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 334 days.

(21) Appl. No.: 12/777,110

(22) Filed: May 10, 2010

(65) Prior Publication Data

US 2010/0217776 A1 Aug. 26, 2010

Related U.S. Application Data

(63) Continuation of application No. 11/193,601, filed on Jul. 29, 2005, now Pat. No. 7,743,066.

(51) Int. Cl.
*G06N 5/00* (2006.01)

(52) U.S. Cl. ........................................... 706/45; 706/46

(58) Field of Classification Search .................... 706/45, 706/46
See application file for complete search history.

(56) References Cited

OTHER PUBLICATIONS

Owens, The Definitive Guide to SQLite, Springer-Verlag New York, Inc., 2006, pp. 1-463.*

* cited by examiner

*Primary Examiner* — Wilbert L Starks
(74) *Attorney, Agent, or Firm* — Workman Nydegger

(57) ABSTRACT

Anonymous types for a programming language. Non-denotable anonymous types are types that a compiler generates on behalf of a programmer and can then be used as nominal types. Insofar as anonymous types do not have a name, they can be used only inside a method in which they are created. Additionally, an anonymous type cannot be exposed in any way outside of the method. Syntax to create an anonymous type is useful when employed with a Select operator to generate a result with a particular shape, without the need of having a regular type for it. Anonymous types are expressible such that an expression of that type can be written. Translation of an anonymous type by a compiler generates a nominal class that implements Equals and GetHashCode methods. There is equivalence of anonymous types within the same method, and conversion of an unrealized structural type into structurally compatible nominal type.

20 Claims, 11 Drawing Sheets

```
public class Customer
{
    public string Name;
    public string Address;
    public string Phone;
    public List<Order> Orders;
}

public class Contact
{
    public string Name;
    public string Phone;
}

class???
{
    public string Name;
    public string Phone;
}

var c = GetCustomer (...);
var contact = new Contact { Name = c.Name, Phone = c.Phone };

var c = GetCustomer (...);
var contact = new { Name = c.Name, Phone = c.Phone };

var c = GetCustomer (...);
var contact = new {c.Name, c.Phone };
```

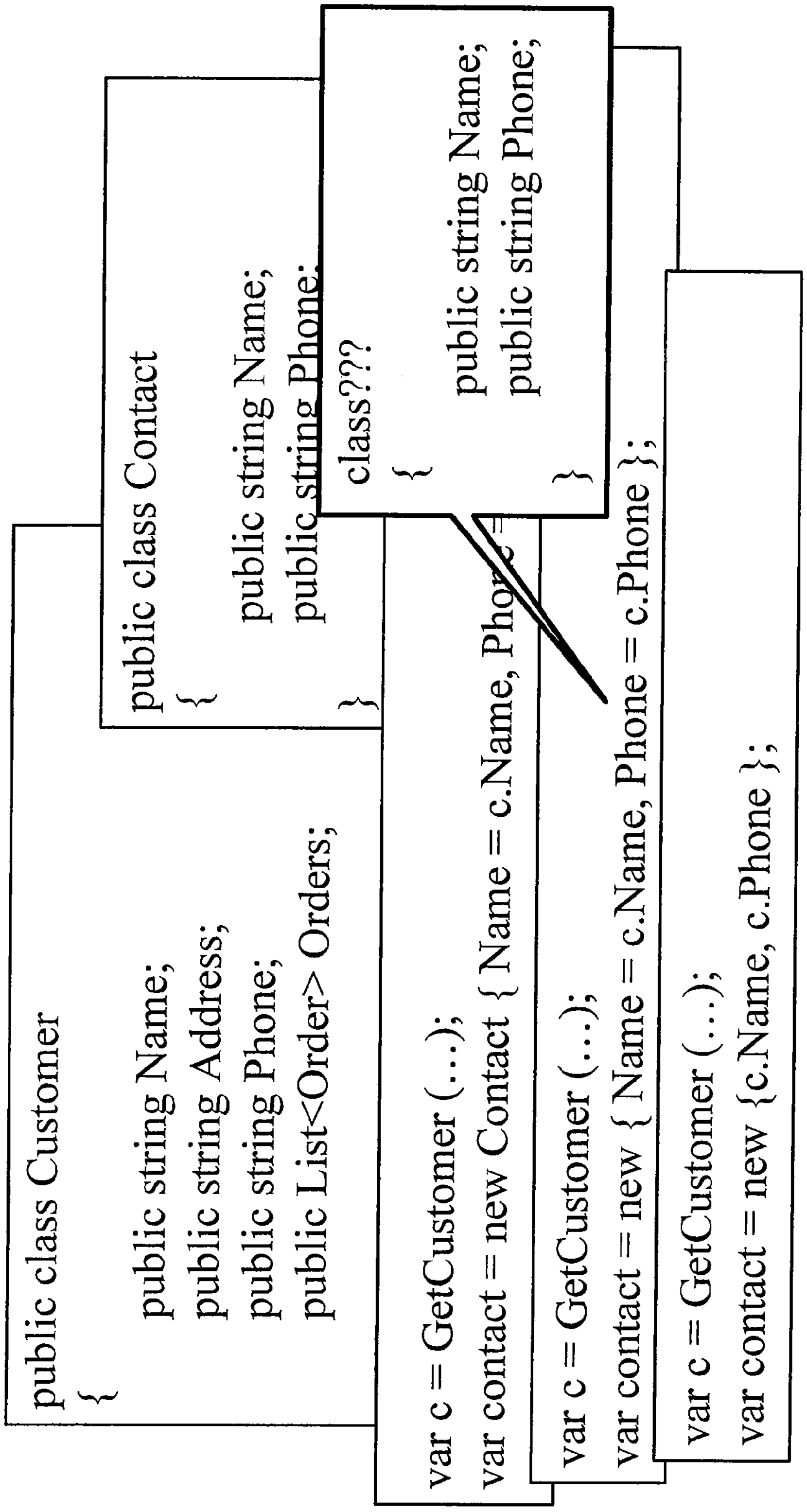

*FIG. 7*

```
primary-no-array-creation-expression:
        ...
        anonymous-object-creation-expression

anonymous-object-creation-expression:
        new   anonymous-object-initializer

anonymous-object-initializer:
        {   member-declarator-listopt   }
        {   member-declarator-list  ,   }

member-declarator-list:
        member-declarator
        member-declarator-list  ,  member-
declarator

member-declarator:
        simple-name
        member-access
        identifier  =  expression
```

*FIG. 8*

ANONYMOUS TYPES FOR STATICALLY TYPED QUERIES

CROSS-REFERENCE TO RELATED APPLICATIONS

This application is a continuation of, and claims the benefit of, and priority to, U.S. application Ser. No. 11/193,601, filed on Jul. 29, 2005 and entitled "ANONYMOUS TYPES FOR STATICALLY TYPED QUERIES" (now U.S. Pat. No. 7,743,066), which application is expressly incorporated herein by this reference in its entirety.

BACKGROUND

The advent of global communications networks (e.g., the Internet) now makes accessible an enormous amount of data. People access and query unstructured and structured data every day. Unstructured data is used for creating, storing and retrieving reports, e-mails, spreadsheets and other types of documents, and consists of any data stored in an unstructured format at an atomic level. In other words, in the unstructured content, there is no conceptual definition and no data type definition—in textual documents, a word is simply a word. Current technologies used for content searches on unstructured data require tagging entities such as names or applying keywords and metatags. Therefore, human intervention is required to help make the unstructured data machine readable. Structured data is any data that has an enforced composition to the atomic data types. Structured data is managed by technology that allows for querying and reporting against predetermined data types and understood relationships.

One of the more important query operations is projection or selection that given a collection of values, selects a subset of the members of each value in the collection. For example, in a relation of books containing the attributes author and title, the formation of a list of the titles of the books written by a particular author. In another example, the following SQL (structured query language) query returns just the Name and Age of each employee Pin the table Employees.

```
Select P.Name, P.Age
From Employees As P
```

The Employees table itself has more columns, such as EmployeeID, Salary, OfficeNumber, Division, etc., which are projected down to just the Name and Age columns. A problem faced with select queries such as the above is that the result set contains rows of the form {string Name; int Age}. That is, it is known that each value in the result set has a Name column of type string and an Age column of type int. Unfortunately, in a nominal type system such as the common language runtime, there is no type that describes those values.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The disclosed innovation introduces a notion of anonymous types, which in one application, can be used to statically type Select queries.

It is often inconvenient to create a separate type for each query result of a query. This becomes more important as the number of queries grow. Anonymous types are types that the compiler generates on behalf of the programmer and can then be used as "normal" (e.g., nominal) types. Insofar as anonymous types do not have a name, it is possible to use them only inside a method in which they are created. Additionally, anonymous types cannot be exposed in any way outside of the method. The syntax to create an anonymous type is particularly useful when employed with a Select operator to generate a result with a particular shape, without the need of having a regular type for it.

The invention disclosed and claimed herein, in one aspect thereof, comprises architecture that employs anonymous types. A system includes a query component that facilitates generating a query of data (e.g., structured or unstructured). Interface to the query component is a type component that automatically generates a non-denotable type (or an anonymous type) in response to the query, and in accordance with a novel aspect.

In another aspect of the innovation, anonymous types are expressible such that an expression of that type can be written. Anonymous types are non-denotable in that the type cannot be written down. As a consequence, variables of anonymous types use type inference.

In another aspect thereof, implementation of an anonymous type by translation into a compiler generates a nominal type that implements Equals and GetHashCode methods.

In yet another aspect, there is equivalence of anonymous types within the same method.

In still another aspect of the disclosed innovation, there is disclosed the conversion of an unrealized structural type into structurally compatible nominal type.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

BRIEF DESCRIPTION OF THE DRAWINGS

FIG. 7 illustrates a use of anonymous types.

FIG. 8 illustrates syntax for anonymous types.

DETAILED DESCRIPTION

Figure 1:
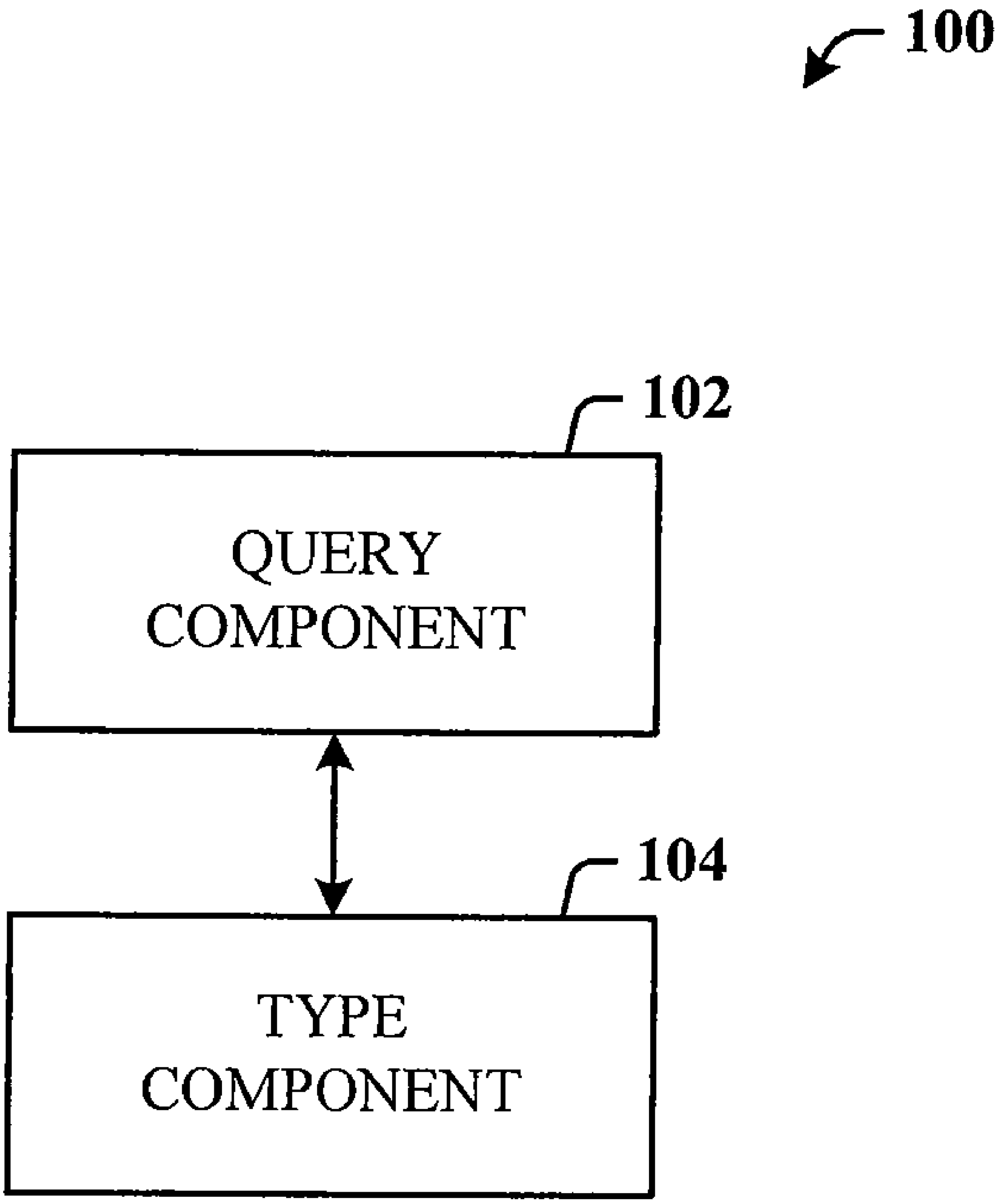
FIG. 1 illustrates a system that employs anonymous types in accordance with the disclosed innovation.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

It is often inconvenient to create a separate type for each query result of a query. This becomes more important as the number of queries grow. Anonymous types are types that the compiler generates on behalf of the programmer and can then be used as "normal" (e.g., nominal) types. Insofar as anonymous types do not have a name (i.e., they are non-denotable), it is possible to use them only inside a method in which they are created. Additionally, anonymous type cannot be exposed in any way outside of the method.

Anonymous types can be most often used in conjunction with type inference, exemplified as in the following snippet of code:

var info=new {Name="Bob", City="Rome"};

The syntax to create an anonymous type resembles object initializers, where the type to be created is omitted. Object initializers are the subject of another patent application entitled "EXTENDING EXPRESSION-BASED SYNTAX FOR CREATING OBJECT INSTANCES" filed Aug. 1, 2005, by the inventors of this application and assigned to the present assignee. An object initializer specifies values for one or more fields or properties of a newly-created object. This syntax is particularly useful when employed with a Select operator to generate a result with a particular shape, without the need of having a regular type for it, as exemplified in the following code:

```
var info = Customers.Select(|c| new Contact {Name = c.Name,
City = c.City});
```

The disclosed innovation introduces a notion of anonymous types, which in one application, can be used to statically type Select queries.

Referring initially to the drawings, FIG. 1 illustrates a system 100 that employs anonymous types in accordance with the disclosed innovation. The system 100 includes a query component 102 that facilitates generating a query of data (e.g., structured or unstructured). Interface to the query component 102 is a type component 104 that automatically generates a non-denotable type (or an anonymous type) in response to the query, and in accordance with a novel aspect.

Figure 2:
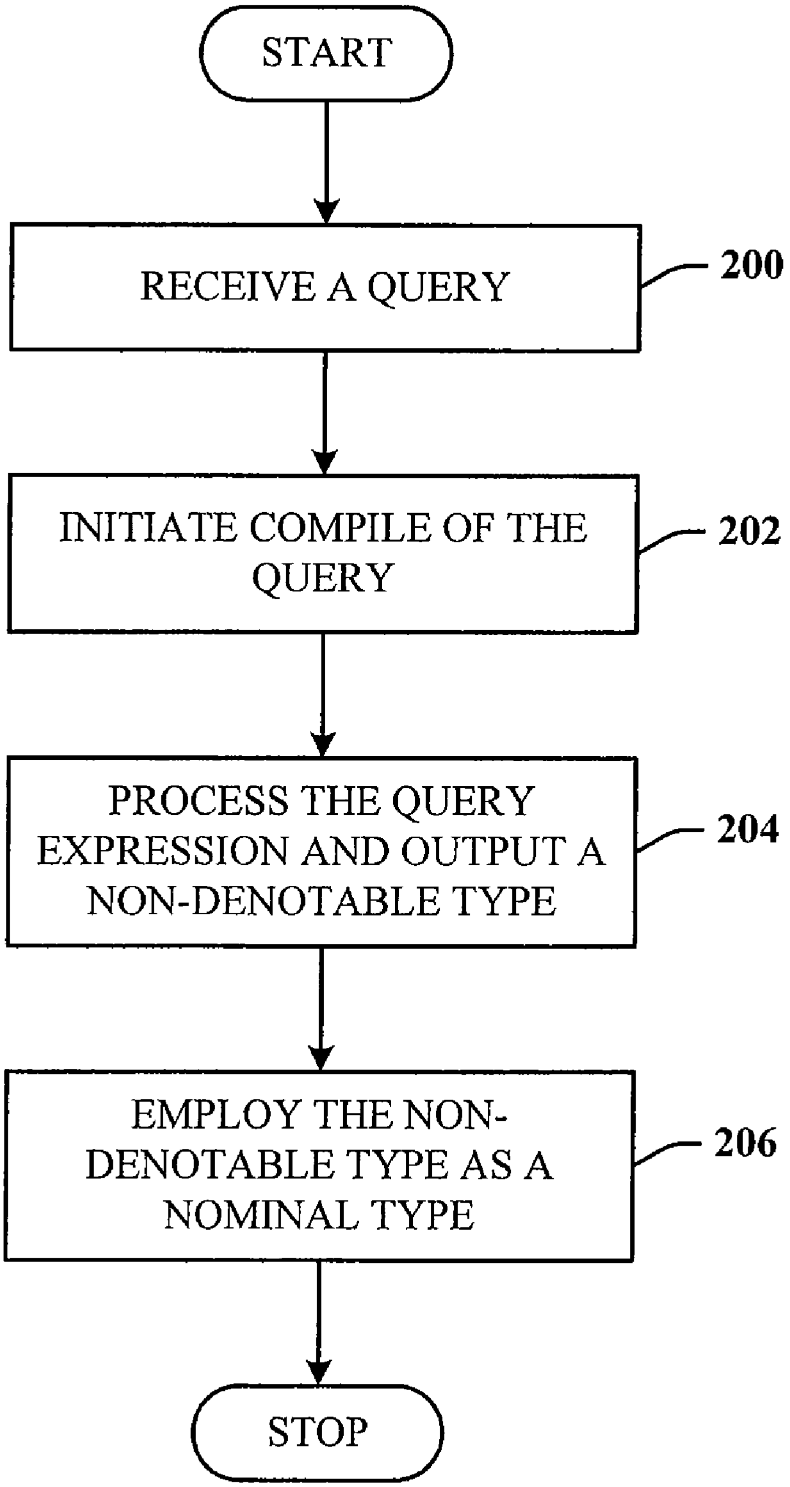
FIG. 2 illustrates a methodology of providing anonymous types in accordance with an aspect

FIG. 2 illustrates a methodology of providing anonymous types in accordance with an aspect. While, for purposes of simplicity of explanation, the one or more methodologies shown herein, e.g., in the form of a flow chart or flow diagram, are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

At 200, a query is received for processing. At 202, a compile process is initiated by the compiler. At 204, the query expression is processed and a non-denotable type is outputted. At 206, the non-denotable type is converted to a nominal type by the compiler. In effect, the non-denotable type is an anonymous type that is represented by a synthesized nominal type.

There are many scenarios where programmers desire to return structured data, but do not want to create a nominal type definition. As described herein, the result set of a Select statement is a prototypical example of this. To support creating structured data without using nominal types, anonymous types can be employed. For example, the SQL (structured query language) query above can be written by returning values of the form new{Name=e.Name, Age=e.Age}.

```
var results = Employees.Select(|e| new{ Name = e.Name, Age
=e.Age })
```

Anonymous types are expressible. That is, they can be the result of an expression as in new {Name=e.Name, Age=e.Age}, but they are not denotable (referred herein as non-denotable). In other words, there is no syntax to write down the type. As a result, an explicitly-typed variable of an anonymous type is not declared. Instead, in one implementation, type inference is employed. When a generic method is called without specifying type arguments, the type inference process attempts to infer type arguments for the call. Type inference allows the type of a variable to be inferred from the expression that is assigned to it. This has practical utility whenever the explicit creation or identification of a type is complex or tedious for the programmer.

Figure 3:
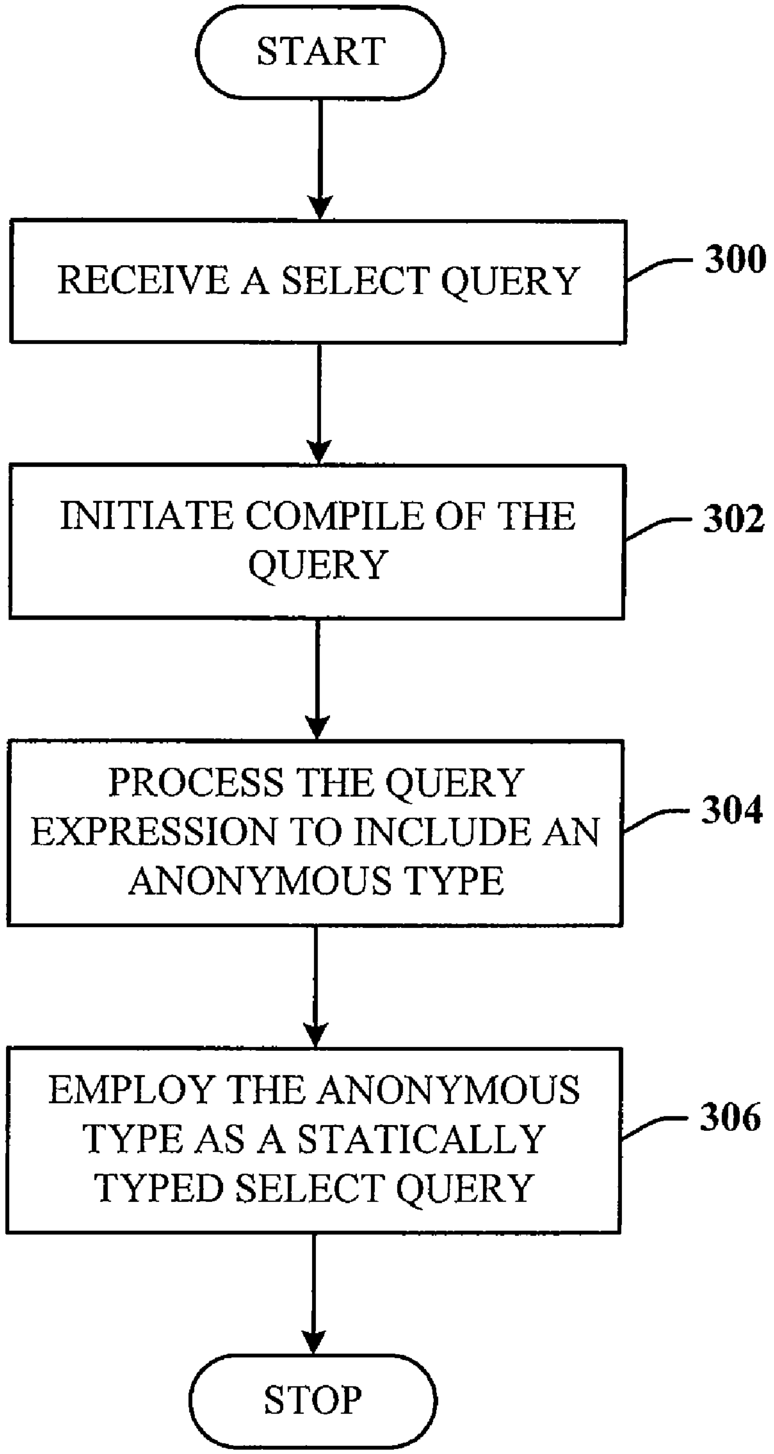
FIG. 3 illustrates a flow diagram of a methodology of utilizing anonymous types in a Select statement.

Accordingly, FIG. 3 illustrates a flow diagram of a methodology of utilizing anonymous types in a Select statement. At 300, Select query is received for processing. At 302, a compile of the query expression is initiated. At 304, the query expression is processed to include an anonymous type. At 306, the anonymous type is employed as a statically typed Select query.

The results variable above in the Employees. Select example, does have a static type. Using pseudo code, the static type looks like IEnumerable< . . . a type with a field Name of type string and a field Age of type Int . . . >, for example, but as described supra, it cannot be written down. The results collection can be iterated over and the Name and Age fields accessed, since the compiler itself has knowledge of the structure of the anonymous type:

```
foreach(r in results)
{
...; string s = r.Name; int n = r.Age; ... //OK
...; Button b = r.Button; ... //Static type error, r
does not have a Button field.
}
```

A reason that anonymous types are not denotable is that the underlying CLR (common language runtime) execution engine does not support them directly, but only supports structured nominal types. Instead, the compiler emits a "normal" class definition with a multi-character (or "mangled") name that has field for each field in the anonymous type, and overrides Equals and GetHashCode methods. For example, the expression new {Name=e.Name, Age=e.Age} could be compiled into a constructor call new C$235 {Name=e.Name, Age=e.Age} where class C$235 {string Name; int Age; public override bool Equals(object other) { . . . }; public override int GetHashCode( )} is anew compiler-generated or synthesized nominal type. Note that the synthesized type can use properties instead of fields as an alternative.

Equivalence of anonymous types. The type correctness rules for anonymous types can be implied by the translation into a compiler-generated nominal type. Additionally, anonymous types are equivalent within the scope of a method. Thus, for example, the assignment x=y below is valid because x and y will have the same compiler-generated type:

```
void F( )
{
    var x = new{ x = 47, y = 11 };
    var y = new{ x = 7, y = 42 };
    x = y; //
}
```

Conversion from anonymous types to compatible nominal types, and nominal types to anonymous types. Since the type of an anonymous type cannot be written down, the anonymous type is not a first class citizen in the sense that values of an anonymous type cannot be passed as arguments to methods, or returned as results from non-generic methods. It is also to be appreciated that conversion can be performed from a nominal type to an anonymous type where the values are sufficiently compatible.

```
g(f(Employees));
??? f(IEnumerable<Employee> Employees)
{
    var results = Employees.Select(|e| new{ Name =
e.Name, Age = e.Age });
    return results;
}
void g(??? results)
{
foreach(r in results)
{
...; string s = r.Name; int n = r.Age; ... //OK
...; Button b = r.Button;11 ... //Static type error, r does
not have a Button field.
}
}
```

Note that anonymous type can be bound to type variable, as in the following example.

```
static void F<T>(T t) { ...t... }
var x = new { a = 5, b = "hello" };
F(x); // T will be bound to the compiler generated type
for x
```

Figure 4:
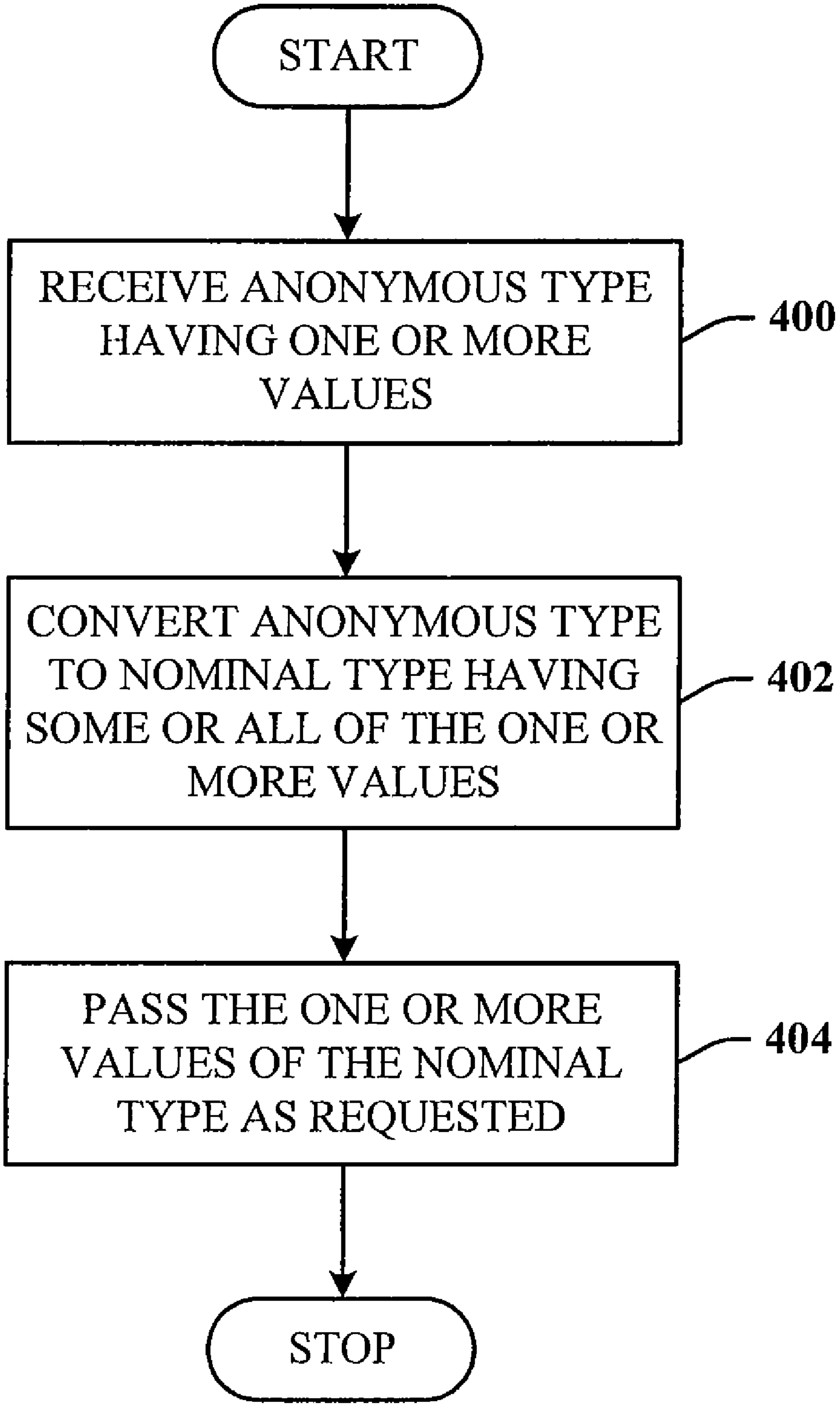
FIG. 4 illustrates a methodology of processing an anonymous type for passing values, according to an aspect.

However, there is not much that can be done with t inside F. In order pass values of anonymous types around in a useful way, they should first be converted to a known nominal type. Accordingly, FIG. 4 illustrates a methodology of processing an anonymous type for passing values, according to an aspect. At 400, an anonymous type is received having one or more values. At 402, the anonymous type is converted to a nominal type having some or all of the one or more values. At 404, the one or more values of the nominal type can now be passed as requested.

One methodology of conversion is to use a mechanism similar to anonymous methods to determine the element type of a query. For example:

```
sequence<Contact> contacts = db.Customers.Where(|c| c.State
== "WA").Select(|c| new{Name, Phone});
```

Here, the result of the .Select operator is an "unrealized structural type". An unrealized structural type is either converted to a nominal type through type inference or converted to a compiler-generated nominal type when no inference can be made. For example, had the left hand side above been "object contacts= . . . ", or "var contacts" then the result of the query would have been an anonymous type.

Figure 5:
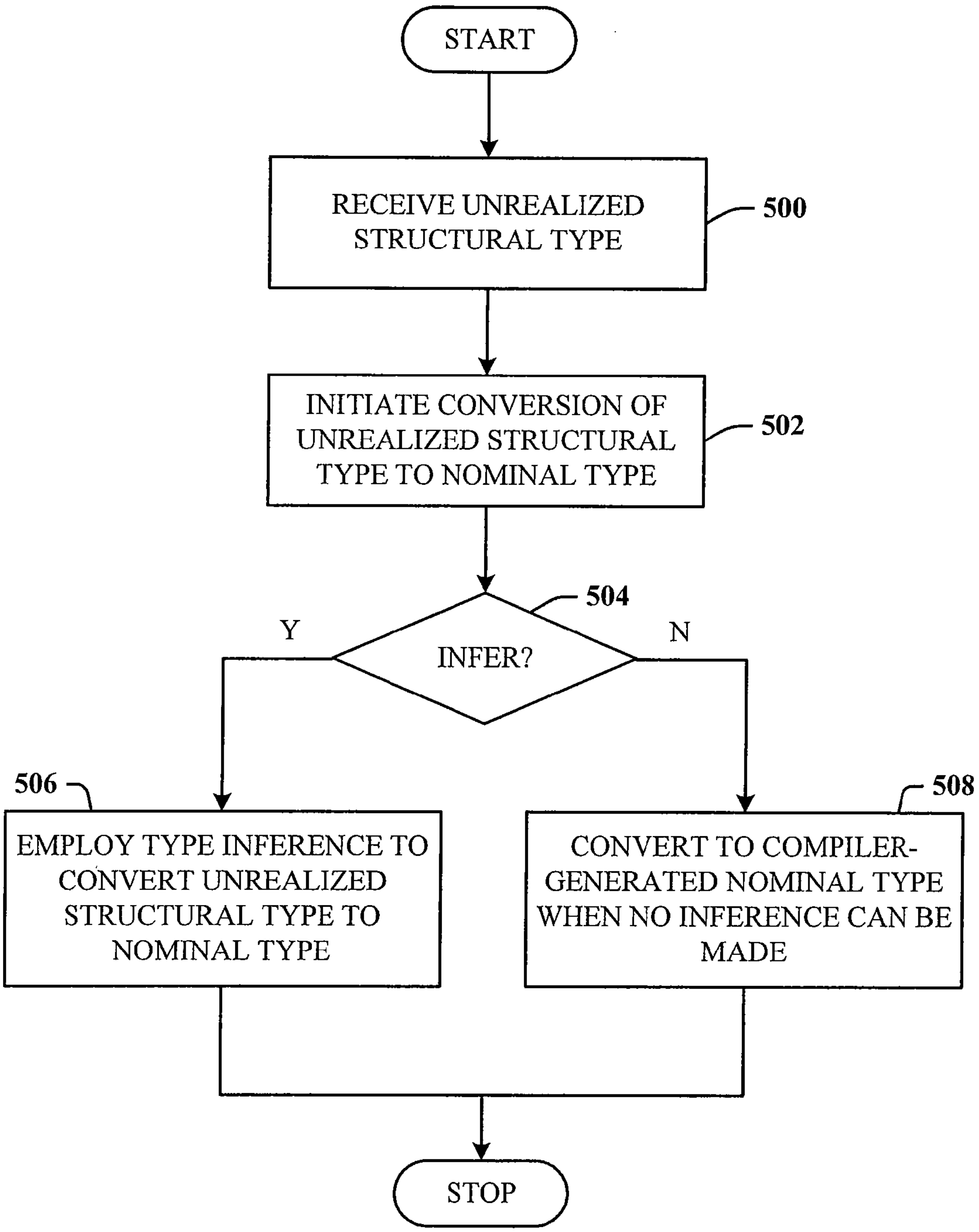
FIG. 5 illustrates a methodology of processing an unrealized type into a nominal type.

Accordingly, FIG. 5 illustrates a methodology of processing an unrealized type into a nominal type. At 500, an unrealized structural type is received for processing. At 502, conversion of the unrealized structural type to a nominal type is initiated. At 504, the system determines if type inference can be employed. If so, flow is to 506 where type inference is employed to convert the unrealized structural type to a nominal type. Alternatively, if type inference cannot be employed, flow is from 504 to 508 where conversion is to a complier-generated nominal type.

An unrealized anonymous type T is compatible with a nominal N if all the fields in T are compatible with corresponding members in N. A field m of type R is compatible with a property or field m of type S where T is implicitly convertible to S. The realization of a value x of the unrealized type T is via the creation of an instance new N{ . . . m=.m; . . . }.

The notion of compatibility can be applied recursively. Consider the following example:

```
IEnumerable<ProductsByCategory> x = db.Products.GroupBy(|p|
p.Category).
Select(|g| new { Category = g.Key,
Products = g.Group.Select(|p| new{ ProductId, ProdName});
```

Figure 6:
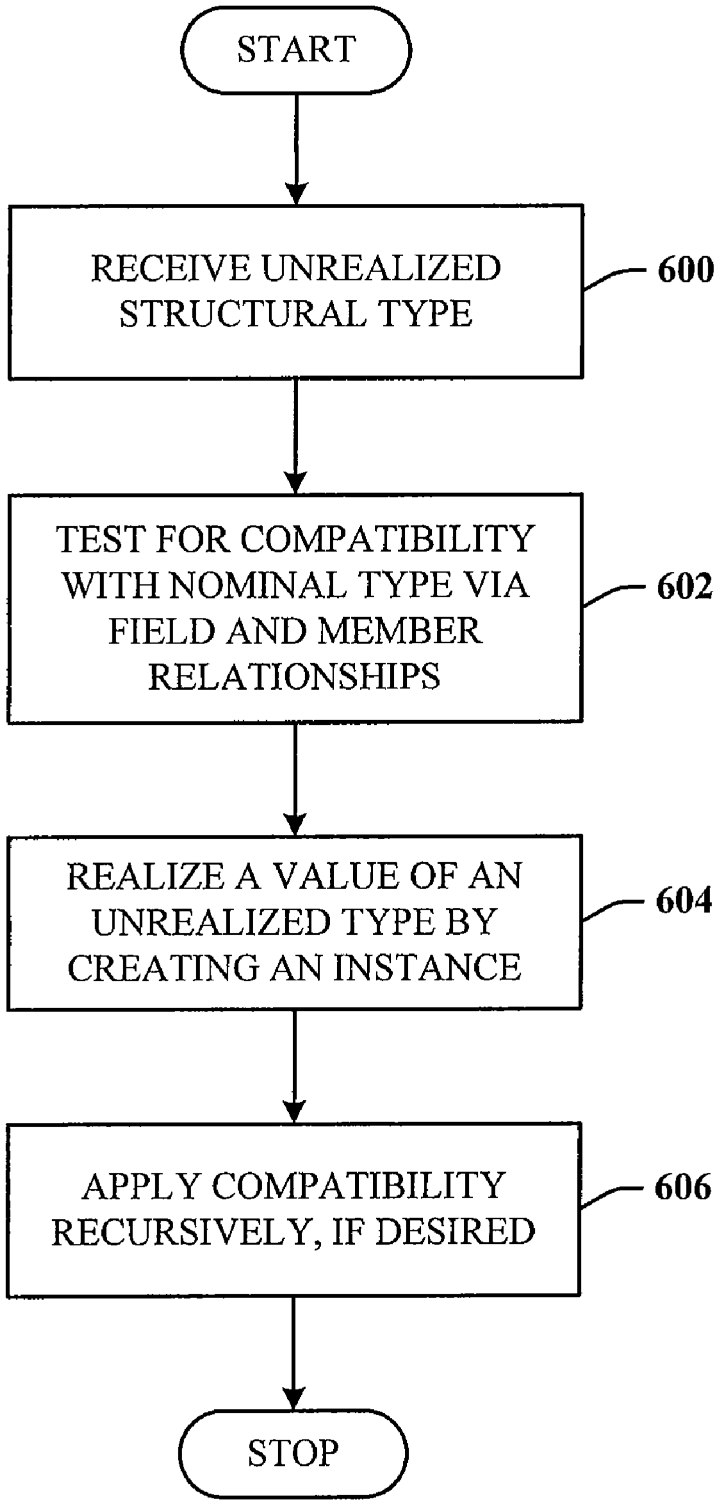
FIG. 6 illustrates a flow diagram of a methodology of compatibility testing in accordance with an aspect.

FIG. 6 illustrates a flow diagram of a methodology of compatibility testing in accordance with an aspect. At 600, an unrealized structural type is received for processing. At 602, compatibility with a nominal type is tested via field and member relationships of the types. At 604, an instance is created to realize a value of an unrealized structural type. At 606, if desired, compatibility can be applied recursively.

The type of the query can be the following unrealized structural type:

```
IEnumerable< ...a type with a field string Category and a field
    IEnumerable<... a type with a field int ProductId and a
field string ProductName ...> Products...
  >
```

A top-level anonymous type is compatible with the nominal type ProductsByCategory, while the nested anonymous type is compatible with Product, as illustrated in the following example:

```
class ProductsByCategory {
   string Category;
   IEnumerable<Product> Products;
}
class Product {
   int ProductId;
   string ProductName;
}
```

FIG. 7 illustrates a use of anonymous types. Here, a non-denotable class "???" is generated when the anonymous type is processed.

FIG. 8 illustrates syntax for anonymous types which can be defined by, but is not limited to, the following grammar:

```
primary-no-array-creation-expression:
      ...
      anonymous-object-creation-expression
anonymous-object-creation-expression:
      new anonymous-object-initializer
anonymous-object-initializer:
      {    member-declarator-listopt    }
      {    member-declarator-list    ,    }
member-declarator-list:
      member-declarator
      member-declarator-list , member-declarator
member-declarator:
      simple-name
      member-access
      identifier    =    expression
```

The syntax builds upon the object initializer mechanism referenced supra. It is to be appreciated that other suitable syntax can be employed.

Figure 9:
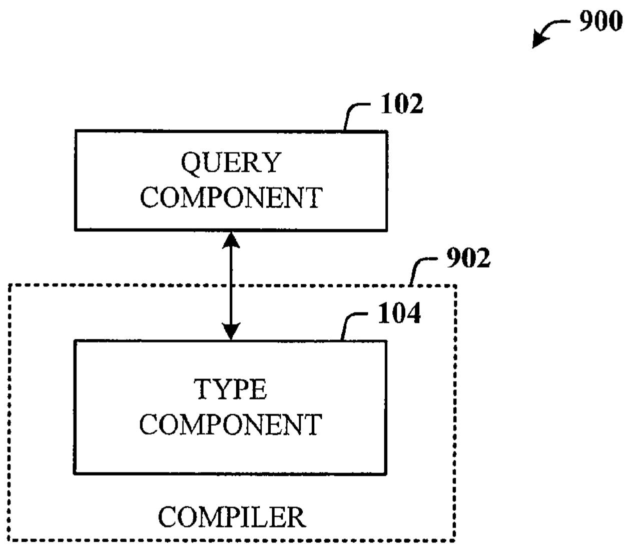
FIG. 9 illustrates a system the employs the type component of FIG. 1 as part of a compiler.

FIG. 9 illustrates a system 900 the employs the type component 104 of FIG. 1 as part of a compiler 902.

Figure 10:
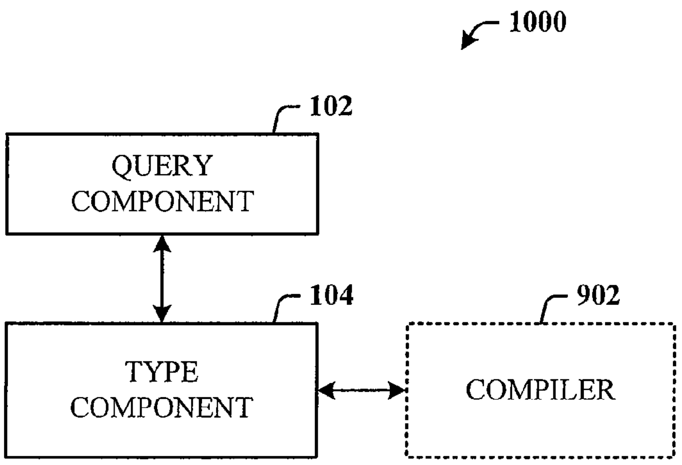
FIG. 10 illustrates a system where the type component is external to the compiler.

FIG. 10 illustrates a system 1000 where the type component 104 is external to the compiler 902.

Figure 11:
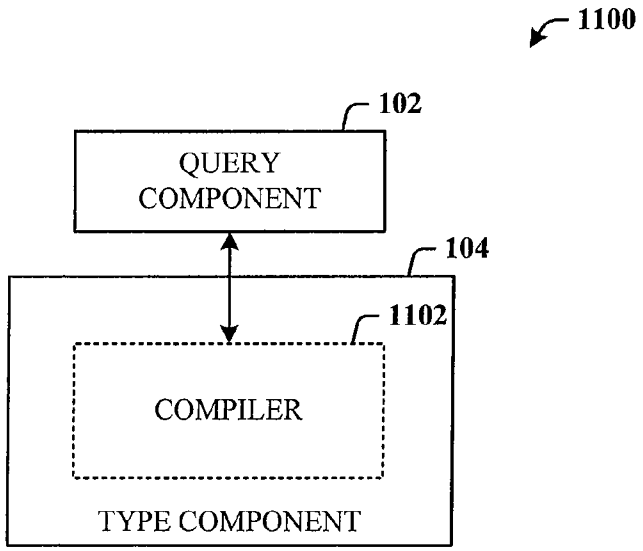
FIG. 11 illustrates a system where the compiler is included as part of the type component.

FIG. 11 illustrates a system 1100 where the compiler 1102 is included as part of the type component 104.

Figure 12:
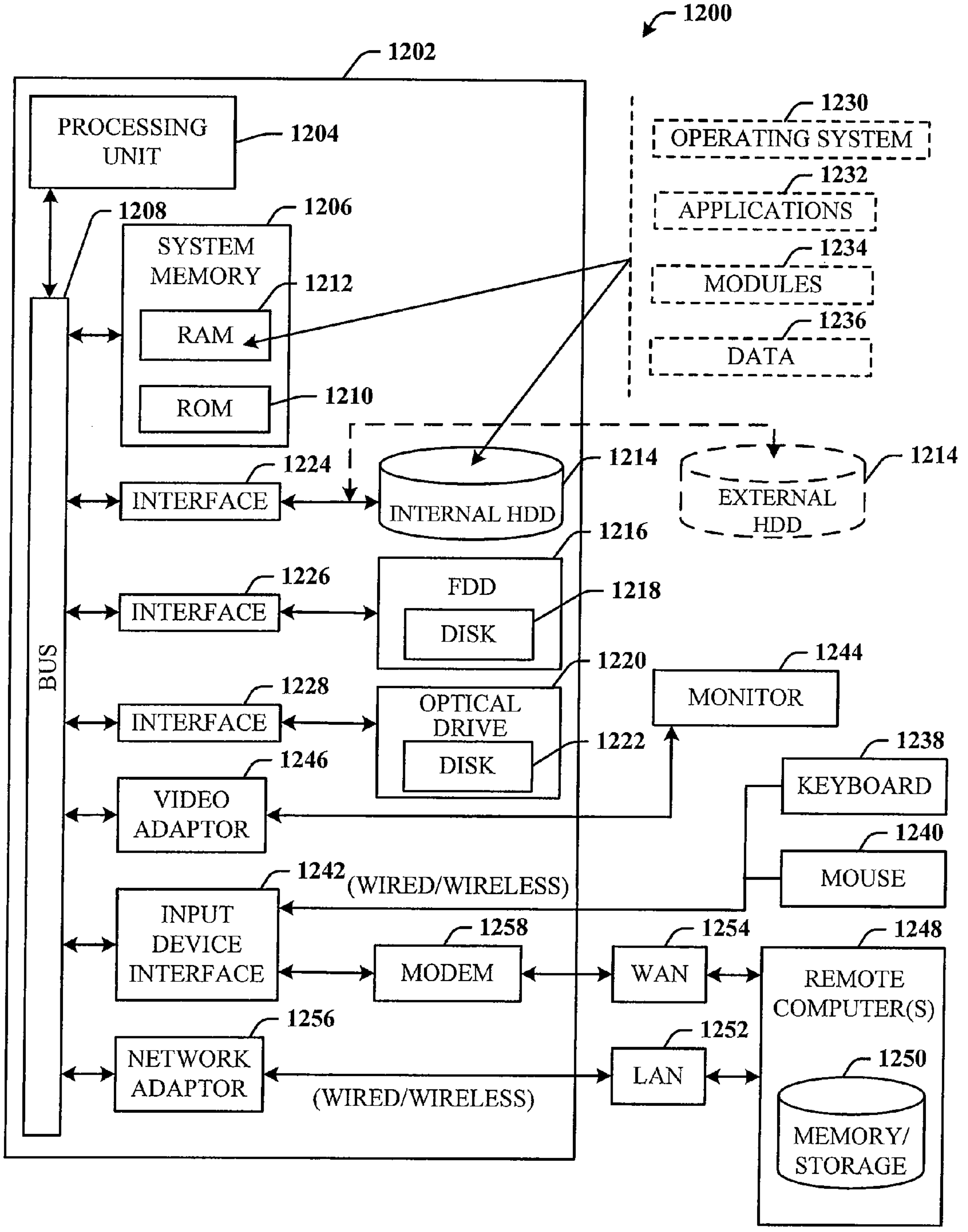
FIG. 12 illustrates a block diagram of a computer operable to process anonymous types of the disclosed architecture.

Referring now to FIG. 12, there is illustrated a block diagram of a computer operable to execute the disclosed anonymous type architecture. In order to provide additional context for various aspects thereof, FIG. 12 and the following discussion are intended to provide a brief, general description of a suitable computing environment 1200 in which the various aspects of the innovation can be implemented. While the description above is in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 12, the exemplary environment 1200 for implementing various aspects includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures may also be employed as the processing unit 1204.

The system bus 1208 can be any of several types of bus structure that may further interconnect to a memory bus (with or without a memory controller), a peripheral bus, and a local bus using any of a variety of commercially available bus architectures. The system memory 1206 includes read-only memory (ROM) 1210 and random access memory (RAM) 1212. A basic input/output system (BIOS) is stored in a nonvolatile memory 1210 such as ROM, EPROM, EEPROM, which BIOS contains the basic routines that help to transfer information between elements within the computer 1202, such as during start-up. The RAM 1212 can also include a high-speed RAM such as static RAM for caching data.

The computer 1202 further includes an internal hard disk drive (HDD) 1214 (e.g., EIDE, SATA), which internal hard disk drive 1214 may also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1202, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed innovation.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is to be appreciated that the innovation can be implemented with various commercially available operating systems or combinations of operating systems.

A user can enter commands and information into the computer 1202 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 1394 serial port, a game port, a USB port, an IR interface, etc.

A monitor 1244 or other type of display device is also connected to the system bus 1208 via an interface, such as a video adapter 1246. In addition to the monitor 1244, a computer typically includes other peripheral output devices (not shown), such as speakers, printers, etc.

The computer 1202 may operate in a networked environment using logical connections via wired and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1202 is connected to the local network 1252 through a wired and/or wireless communication network interface or adapter 1256. The adaptor 1256 may facilitate wired or wireless communication to the LAN 1252, which may also include a wireless access point disposed thereon for communicating with the wireless adaptor 1256.

When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 via the serial port interface 1242. In a networked environment, program modules depicted relative to the computer 1202, or portions thereof, can be stored in the remote memory/storage device 1250. It will be appreciated that the network connections shown are exemplary and other means of establishing a communications link between the computers can be used.

The computer 1202 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 13:
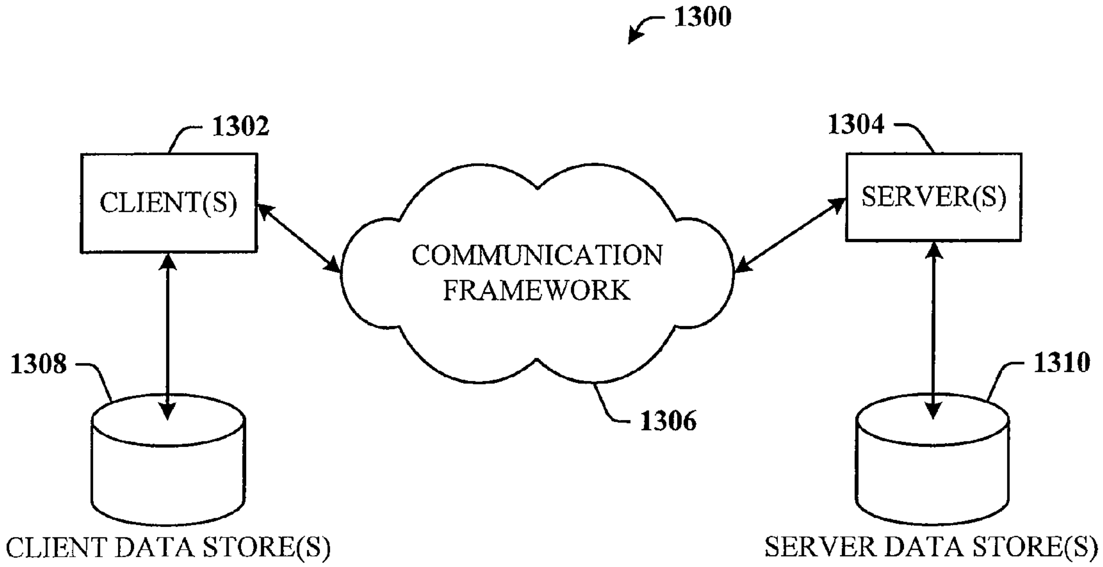
FIG. 13 illustrates a schematic block diagram of an exemplary computing environment that can employ anonymous types.

Referring now to FIG. 13, there is illustrated a schematic block diagram of an exemplary computing environment 1300 that can process anonymous types in accordance with another aspect. The system 1300 includes one or more client(s) 1302. The client(s) 1302 can be hardware and/or software (e.g., threads, processes, computing devices). The client(s) 1302 can house cookie(s) and/or associated contextual information by employing the subject innovation, for example.

The system 1300 also includes one or more server(s) 1304. The server(s) 1304 can also be hardware and/or software (e.g., threads, processes, computing devices). The servers 1304 can house threads to perform transformations by employing the invention, for example. One possible communication between a client 1302 and a server 1304 can be in the form of a data packet adapted to be transmitted between two or more computer processes. The data packet may include a cookie and/or associated contextual information, for example. The system 1300 includes a communication framework 1306 (e.g., a global communication network such as the Internet) that can be employed to facilitate communications between the client(s) 1302 and the server(s) 1304.

Communications can be facilitated via a wired (including optical fiber) and/or wireless technology. The client(s) 1302 are operatively connected to one or more client data store(s) 1308 that can be employed to store information local to the client(s) 1302 (e.g., cookie(s) and/or associated contextual information). Similarly, the server(s) 1304 are operatively connected to one or more server data store(s) 1310 that can be employed to store information local to the servers 1304.

What has been described above includes examples of the disclosed innovation. It is, of course, not possible to describe every conceivable combination of components and/or methodologies, but one of ordinary skill in the art may recognize that many further combinations and permutations are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented method of compiling a query operation, comprising:

using a compiler that interacts with a processor of a computing system to:

initiate a compile process on a query;

infer a composite data type from one or more expressions in the query;

convert the inferred composite data type into a statically typed query that is a structurally compatible nominal type, wherein the statically typed query is a static type and includes a nominal type;

test for type compatibility of the nominal type and a non-denotable anonymous type of the query, wherein testing for compatibility is performed based at least in part on a relationship between the non-denotable anonymous type and a member of the nominal type; and convert an unrealized structural type to a synthesized nominal type, wherein the synthesized nominal type is generated by creating a normal class definition comprising at least one of a field associated with a member of one or more members of the non-denotable anonymous type or a property associated with the member of the one or more members of the non-denotable anonymous type.

2. The computer-implemented method of claim 1, further comprising automatically generating the non-denotable anonymous type in response to the query.

3. The computer-implemented method of claim 1, wherein the non-denotable anonymous type is created inside a method.

4. The computer-implemented method of claim 3, wherein the non-denotable anonymous type is not exposed outside the method.

5. The computer-implemented method of claim 1, wherein the synthesized nominal type implements at least one of an Equals method or a GetHashCode method.

6. The computer-implemented method of claim 1, wherein the one or more expressions in the query include a Select operator followed by a definition of the non-denotable anonymous type.

7. The computer-implemented method of claim 1, further comprising converting the non-denotable anonymous type into the statically typed query that includes the nominal type.

8. The computer-implemented method of claim 7, wherein the non-denotable anonymous type includes one or more values and the nominal type includes all of the one or more values.

9. The computer-implemented method of claim 1, wherein testing for type compatibility is based at least in part on a relationship between a field and a member.

10. A computer-implemented method of processing a query operation, comprising:

receiving a query as a query expression;

processing the query expression using one or more processors of a computing system to thereby output a non-denotable anonymous type, wherein the non-denotable anonymous type is not declared by a programmer, and wherein the non-denotable anonymous type is a composite data type generated on behalf of the programmer based on, at least in part, the query expression, which query expression is assigned to a variable, the query expression including a Select operator followed by a definition of the non-denotable anonymous type; and converting the non-denotable anonymous type into a statically typed query that includes a nominal type, wherein converting the non-denotable anonymous type ensures consistent use of variables at based on, at least in part, the nominal type.

11. The computer-implemented method of claim 10, wherein the non-denotable anonymous type includes one or more values such that converting the non-denotable anonymous type converts the non-denotable anonymous type into a nominal type having all of the one or more values.

12. The computer-implemented method of claim 10, further comprising converting an unrealized structural type into a nominal type using type inference.

13. The computer-implemented method of claim 10, further comprising converting an unrealized structural type into a synthesized nominal type.

14. The computer-implemented method of claim 10, further comprising testing for type compatibility of a nominal type and an unrealized non-denotable anonymous type based in part on a relationship between a field and a member.

15. The computer-implemented method of claim 10, wherein the non-denotable anonymous type is bound to a type variable.

16. The computer-implemented method of claim 10, wherein the non-denotable anonymous type is defined at least in part by the following syntax:

primary-no-array-creation-expression:
    . . .
    anonymous-object-creation-expression
anonymous-object-creation-expression:
    new anonymous-object-initializer
anonymous-object-initializer:
    {member-declarator-listopt}
    {member-declarator-list}
member-declarator-list:
    member-declarator
    member-declarator-list, member-declarator member-declarator:
simple-name
member-access
identifier=expression.

17. The computer-implemented method of claim 10, wherein the non-denotable anonymous type is output inside a method.

18. The computer-implemented method of claim 17, wherein the non-denotable anonymous type is not exposed outside the method.

19. The computer-implemented method of claim 10, further comprising representing the non-denotable anonymous type by a synthesized nominal type implementing at least one of an Equals method or a GetHashCode method.

20. A computer-readable storage medium having stored thereon computer executable instructions that, when executed by one or more processors of a computing system, cause the computing system to perform the method of claim 10.

* * * * *